United States Patent [19]

Bankay et al.

[11] Patent Number: 5,787,153
[45] Date of Patent: Jul. 28, 1998

[54] SYSTEM FOR INCREMENTAL REDISTRIBUTION OF TELEPHONY APPLICATIONS COMPUTING WORKLOAD

[75] Inventors: Robert Bankay, Richmond, Calif.; Suren Ram Gulrajani, Frazer, Pa.; Samuel Cannavo, Boston, Mass.

[73] Assignee: Unisys Corporation, Blue Bell, Pa.

[21] Appl. No.: 694,517

[22] Filed: Aug. 9, 1996

Related U.S. Application Data

[63] Continuation of Ser. No. 537,096, Sep. 29, 1995, abandoned.

[51] Int. Cl.$^6$ .................................................. H04M 1/64
[52] U.S. Cl. ............................... 379/88; 379/133; 379/221
[58] Field of Search ........................... 379/67, 88, 89, 379/133, 134, 137, 333, 334, 220, 221, 229; 370/464, 468, 465, 536

[56] References Cited

U.S. PATENT DOCUMENTS

| | | | |
|---|---|---|---|
| 4,754,479 | 6/1988 | Bicknell et al. | 379/207 |
| 4,790,003 | 12/1988 | Keyley et al. | 379/142 |
| 4,811,334 | 3/1989 | Matt | 370/60 |
| 4,933,967 | 6/1990 | Lo et al. | 379/94 |
| 5,029,199 | 7/1991 | Jones et al. | 379/89 |
| 5,036,535 | 7/1991 | Gechter et al. | 379/210 |
| 5,113,430 | 5/1992 | Richardson, Jr. et al. | 379/94 |
| 5,175,761 | 12/1992 | Khalid et al. | 379/89 |
| 5,229,259 | 3/1994 | Otto | 379/221 |
| 5,231,649 | 7/1993 | Duncanson | 370/536 |
| 5,260,990 | 11/1993 | MeLampy et al. | 379/67 |
| 5,274,696 | 12/1993 | Perelman | 379/89 |
| 5,278,897 | 1/1994 | Mowery et al. | 379/212 |
| 5,293,376 | 3/1994 | White | 370/54 |
| 5,375,167 | 12/1994 | Bales et al. | 379/207 |
| 5,377,262 | 12/1994 | Bales et al. | 370/220 |
| 5,381,462 | 1/1995 | Larson et al. | 379/106 |
| 5,388,151 | 2/1995 | Khalid et al. | 379/67 |

*Primary Examiner*—Fan S. Tsang
*Attorney, Agent, or Firm*—John B. Sowell, Esq.; Mark T. Starr, Esq.; John F. O'Rourke, Esq.

[57] ABSTRACT

Disclosed is a telephony messaging transfer system permitting a messaging host to redistribute its processing and/or storage load to another messaging host. An administrator can dynamically control the amount of time needed to transfer specified mailboxes by monitoring the progress on-line and increasing or decreasing the number of transfer dialogs to be used in the transfer process. Also provided is a predictive simulator for simulating the transfer process and providing statistics that can be used to adjust the timing of the actual transfer.

25 Claims, 6 Drawing Sheets

FIG. 1

```
┌─────────────────────────────────────────────┐
│                                    ╱─ 200   │
│                                             │
│  ┌───────────────────────┐                  │
│  │ SESSION NUMBER ( )    │─ 202             │
│  └───────────────────────┘                  │
│  ┌────────────────────────────────┐         │
│  │ RECORDING TIME LIMIT(SEC) ( )  │─ 204    │
│  └────────────────────────────────┘         │
│  ┌────────────────────────────────┐         │
│  │ MAXIMUM TRANSFER DIALOGS ( )   │─ 206    │
│  └────────────────────────────────┘         │
│  ┌──────────────────────────────────┐       │
│  │ TRANSFER MAILBOXES(Y/N) ( )      │─ 208  │
│  ├──────────────────────────────────┤       │
│  │ TRANSFER AUTO ATTENDANTS(Y/N) ( )│─ 209  │
│  └──────────────────────────────────┘       │
│  ┌─────────────────┐                        │
│  │ PARTITION ( )   │─ 21                    │
│  ├─────────────────┤                        │
│  │ LOCATION ( )    │─ 211                   │
│  └─────────────────┘          ╱─ 212        │
│  ┌────────────────────────────────────────┐ │
│  │ ENTER UP TO 10 NXX's FOR MBX TRANSFER OR│ │
│  │ LEAVE BLANKS FOR ALL MBX's IN LOCATION:│ │
│  │ ( )( )( )( )( )( )( )( )( )( )         │ │
│  └────────────────────────────────────────┘ │
│  ┌────────────────────────────────────────┐ │
│  │ ENTER UP TO 6 AUTO ATTENDANT ID's FOR  │ │
│  │ TRANSFER OR LEAVE BLANKS FOR AUTO      │─ 214
│  │ ATTENDANTS IN LOCATIONS:               │ │
│  │ ( )( )( )( )( )( )                     │ │
│  └────────────────────────────────────────┘ │
└─────────────────────────────────────────────┘
```

SYSTEM FOR INCREMENTAL REDISTRIBUTION OF TELEPHONY APPLICATIONS COMPUTING WORKLOAD

CROSS-REFERENCE TO RELATED APPLICATIONS

This is a continuation of U.S. patent application Ser. No. 08/537,096 filed Sep. 29, 1995, now abandoned.

FIELD OF THE INVENTION

The present invention generally relates to telephony applications, and more particularly to a system and method for re-distributing the telephony messaging application workload by incrementally migrating selected voice messages and data from an originating host to a destination host(s).

BACKGROUND OF THE INVENTION

The basic elements of a telephony application include call flows, functions, and prompts. Call flows define the logical flow of the application interface to the caller (the person that dialed a phone number and was transferred to the telephony application in question). Functions represent the software building blocks employed to implement the desired call flow functionality. A function is computer code and may involve access to an application database. Each function produces a result that determines the path of the associated call flow. Prompts are logical groups or sequences of pre-recorded, typically digitized, voice. Prompts are presented to the caller through control of the call flows.

In a telephone system, a network applications platform (NAP) may be located at a local telephone company connected to one or more central offices or switches, or could alternatively be located on the premises of a customer, such as a large or medium-sized company. In the latter case, the NAP would typically be connected to a private branch exchange (PBX) instead of a PSTN. Telephone customers typically demand 100% system availability, which means that, for a large customer having hundreds or even thousands of employees at a given location, it is extremely difficult to take the telephony application off-line (out of service) for even a short time to make updates or modifications. Therefore, when it becomes necessary to modify the application in any way, the application provider needs a way to make such modifications in a way that minimizes the out-of-service condition for the customers or subscribers. This need is particularly severe for high volume telephony systems, which typically cannot be taken out of service without inconveniencing significant numbers of users.

In current telephony systems, recorded voice messages and their corresponding data require significant amounts of storage space, and systems are beginning to reach or exceed their storage and processing capacity as the number of subscribers increases. To help alleviate storage and processing limitations on a given host, it is often necessary to add an additional system host to redistribute and share the work load.

When a single host becomes overloaded, it becomes necessary to add a new host to share the work load. To accomplish this sharing, it is necessary to transfer static and dynamic data associated with messaging from the original host to the new one. Static data includes data that typically remains constant, such as a subscriber's mailbox storage location or address, protocol data and other required system data. Dynamic data includes variable data, such as a subscriber's voice messages, greetings, and the like.

Using the standard methods, a problem arises when transferring data between the two hosts. Typically, the telephony messaging system remains out of service for the duration of the period that it takes to transfer the voice and data stored in voice mailboxes. For larger systems (e.g., those having 100,000 to 150,000 subscribers), transferring voice and data may take several hours to complete, leaving the subscribers with no telephony service. Therefore, there is a need for a telephony system that can accomplish the transfer as quickly as possible, and cause a minimal out-of-service condition for the users of the messaging service.

SUMMARY OF THE INVENTION

The present invention provides a system for distributing the work load of a telephony messaging service by efficiently transferring voice messages and data in small increments from the originating host to the destination host. These small increments do not cause out-of-service conditions for the users not being migrated; and the very efficient transfer mechanism reduces the time during which the small increment of user services being transferred is out of service. Thus, the invention permits the transfer of selected user voice mailboxes from one host to another while minimizing out-of-service conditions, and is transparent to the end users.

In a presently preferred embodiment of the invention, the administrator can specify the number of concurrent dialogs (simultaneous paths) that are to be used in transferring the voice messages from the defined increment of voice mailboxes to the new host. This number is dynamically scaleable. Therefore, a system administrator can control the transfer, while it is in progress, to enhance efficiency by increasing or decreasing the number of dialogs utilized in the transfer.

In preferred embodiments, the on-line monitoring of transfer options allows the administrator to restart or terminate the transfer if an error occurs. In addition, the administrator is permitted to view the statistics on which mailboxes transfer successfully, which mailboxes are partially transferred, and which transfers are pending.

In addition, a predictive simulator is provided for use by the administrator to simulate the process of transferring mailboxes in the voice messaging system in advance of the actual transfer process. The simulator calculates the time it will take to transfer all mailboxes in the actual transfer process. The simulator looks at the actual contents of the mailboxes and determines which mailboxes will take the most time to transfer. The simulator can be used to determine the timing of a transfer and to plan the operations for the transfer in advance of the actual transfer.

The present invention replaces a process that would typically require a total service shut down for several hours or days with a process that accomplishes the same function incrementally using many short interruptions for small numbers of users, with a high probability that the affected users will not notice any service interruption. A premise of the invention is that, for a given volume of traffic and users, service may be interrupted for a small segment of users and a small duration of time. Such an interruption is not noticeable and therefore the service appears to be uninterrupted for all users. In practice, if the duration of service interruption for a small segment of users is of such a length that there is a 90% or greater probability that no one user in the affected segment of users would notice it, then for all practical purposes the service interruption is invisible to all users. The smaller the number of users affected, the longer the service interruption that will be consistent with a given probability level that any user may notice the interruption.

The corollary is that for a large number of users, even a minute interruption of service would be noticed by some users, i.e., the probability of not affecting some users is close to zero for a service interruption of any duration, no matter how quickly the function is accomplished.

The foregoing and other objects, features and advantages of the present invention will be apparent from the detailed description of presently preferred embodiments of the invention.

DETAILED DESCRIPTION OF PREFERRED EMBODIMENTS

Figure 1:
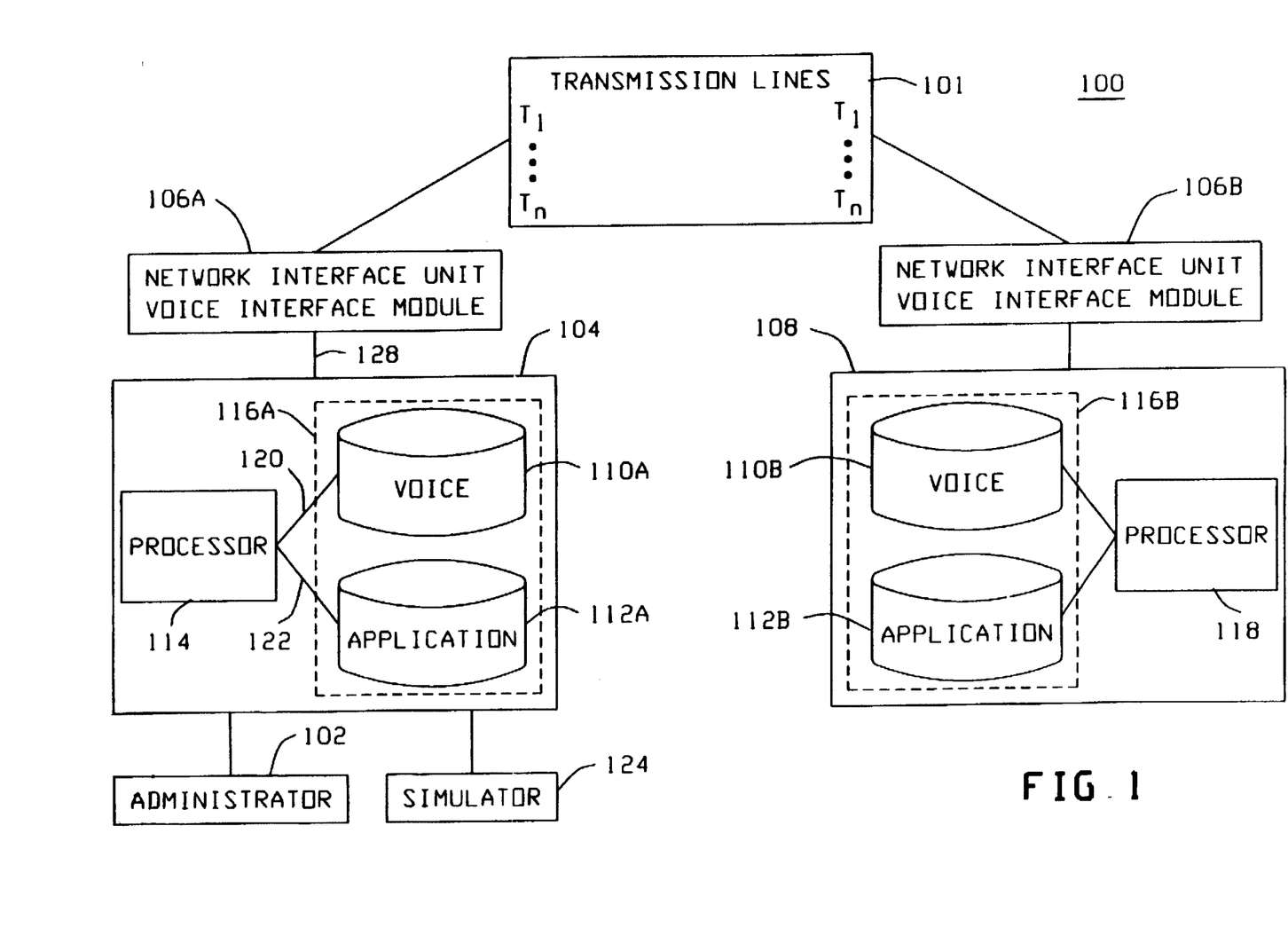
FIG. 1 is a block diagram of one presently preferred embodiment of a system for transferring a voice messaging load in a telephony voice messaging system in accordance with the present invention.

The present invention is directed to a system and method for processing and transferring voice messages and data (i.e., loads) between and among two or more telephony system hosts. FIG. 1 is a high level block diagram of a preferred embodiment of a telephony system 100 according to the present invention. The system 100 includes dedicated transmission lines (e.g., T1 lines) 101; a source host 104; network interface units and voice interface modules 106A, 106B; and a destination host 108. Each host 104, 108 has storage space 110A, 100B for voice message and storage space 112A, 112B for application data. Each voice message and its associated application data are sometimes jointly referred to herein as a mailbox 116A, 116B located at a specific address of a processor 114, 118.

Figure 2:
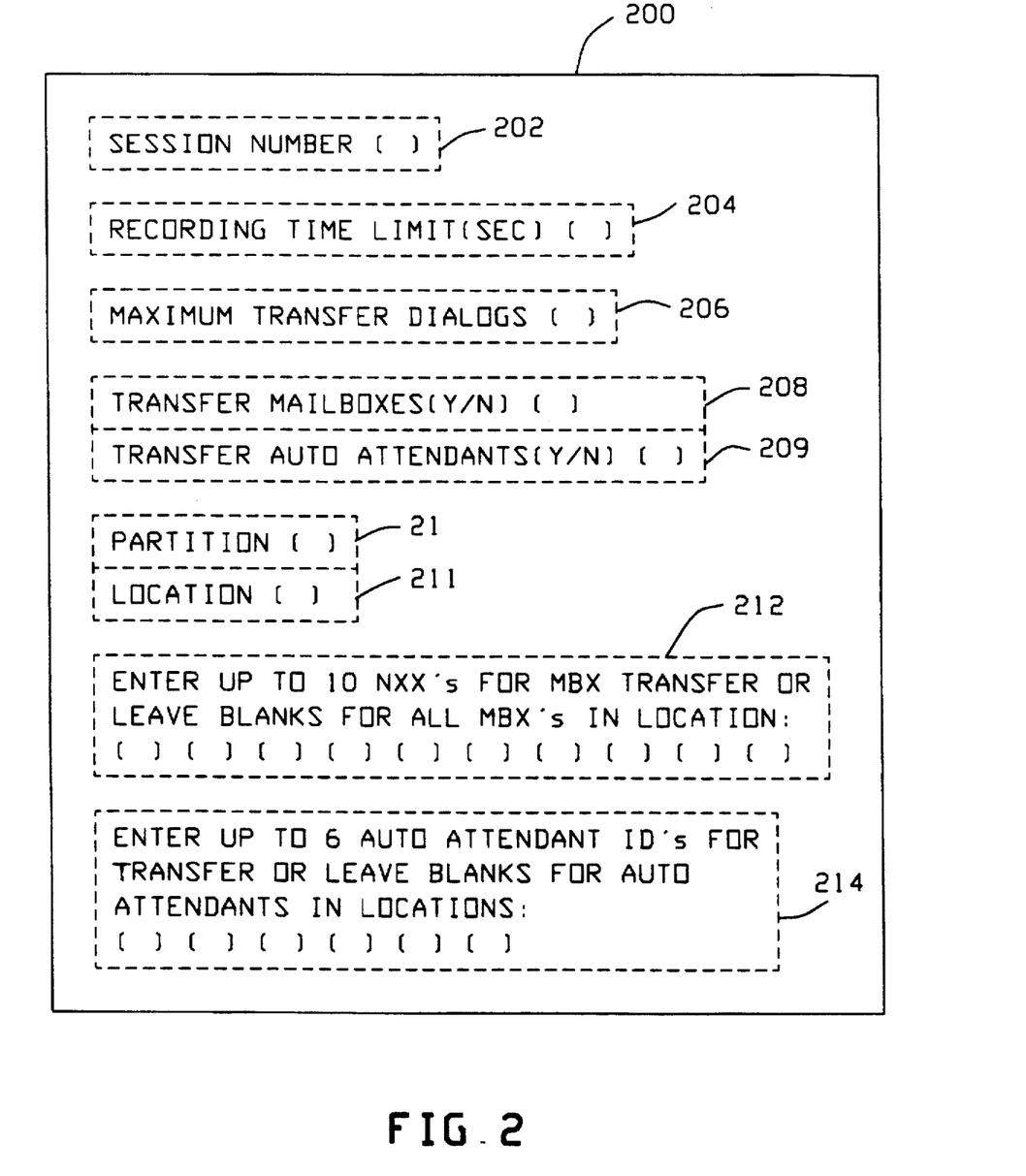
FIG. 2 is an exemplary Sessions Definition Screen employed to define a transfer session and specify selection criteria for mailboxes to be transferred.
Figure 3:
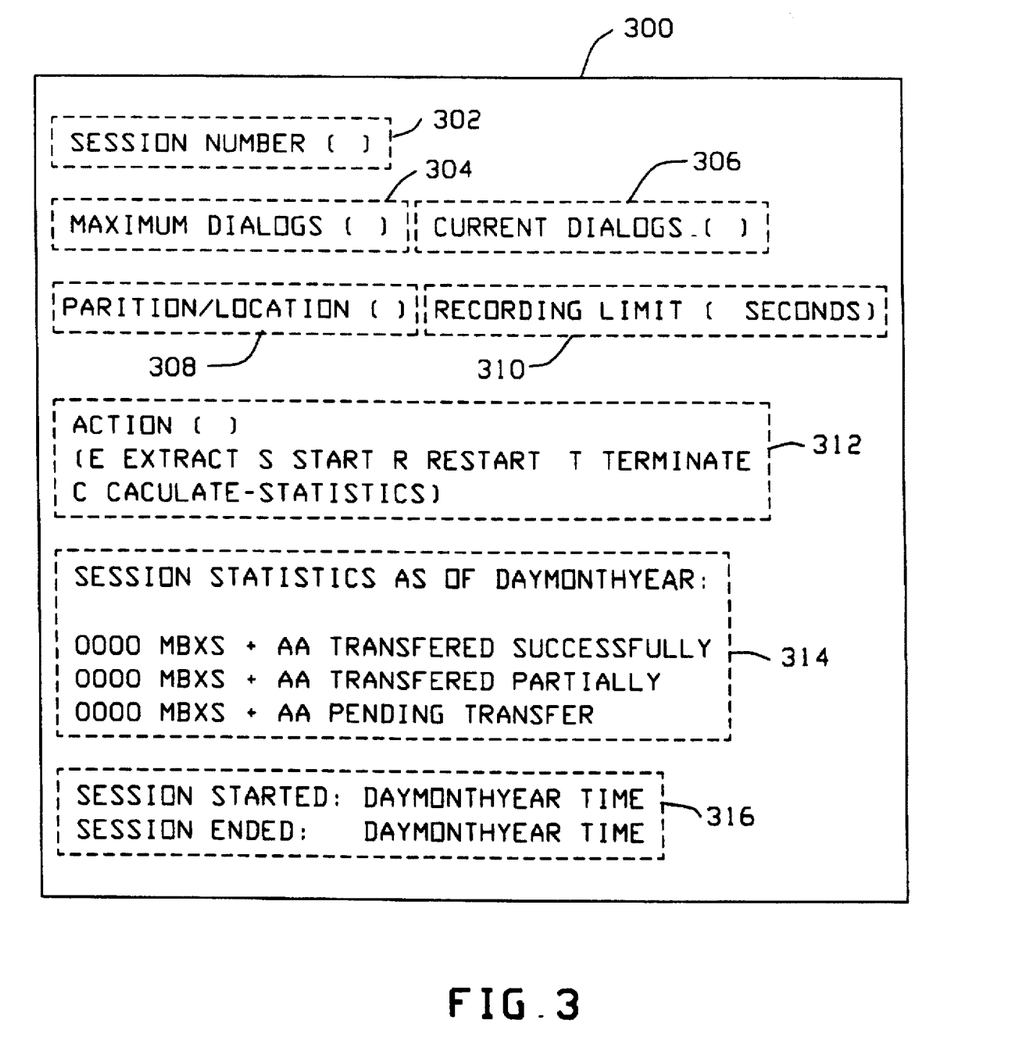
FIG. 3 is an exemplary Sessions Control Screen used to initiate, monitor and control a transfer session.

An administrator 102 manages the telephony system 100 through a computer terminal (not shown). Exemplary screen displays of the administrator 102 are shown in FIGS. 2 and 3. The administrator 102 selects which voice messages and data from storage 110, 112, are to be transferred from the source host 104 to the destination host 108. To assist the administrator 102 in selecting the quantity of voice messages and data to be transferred, a predictive simulator 124, connected to the source host 104, can be employed to simulate the process of transferring voice and data between hosts 104 and 108, in advance of the transfer. The simulator 124 determines the amount of time it will take to transfer voice and data and determines which specific voice messages will require the most time to transfer. Thus, the simulator 124 can be used, e.g., by the administrator 102, to determine the time required and to plan the operations for the transfer, in advance of the actual transfer. It is contemplated that the simulator 124 may be programmed to automatically plan and perform the transfer process independently of the administrator 102.

Hardware elements of the presently preferred embodiments will now be briefly described in more detail. Hosts 104 and 108 are each an A Series computer constructed and arranged to function as a Network Application Platform (NAP), a telephony messaging system designed by Unisys Corporation, of Blue Bell, Pa. However, hosts 104 and 108 may be any computer system platform. In the preferred embodiment, each host handles approximately 100,000 to 150,000 subscribers. The hosts 104, 108 are connected to T1 lines 101. The Network Interface Module (NIU) and Voice Interface Module (VIM) hardware 106A, 106B allow the source host 104 and the destination host 108 to interact with the T1s 101. The NIU and VIM 106A, 106B in the preferred embodiment of the present invention are available from Unisys. Further information about these devices is provided in U.S. Pat. No. 5,133,004, Jul. 21, 1992, titled "Digital Computer Platform for Supporting Telephone Network Applications."

In a presently preferred embodiment of the invention, a dedicated NIU 106B is established at the destination host 108 and at least six (6) transmission lines 101 are used between the destination host NIU/VIM 106B and the source host NIU/VIM 106A. Each T1 line can normally handle twenty-four (24) voice conversations. In another embodiment of the invention, the source host 104 uses the idle capacity of the NIU 106A or, in effect, shares the NIU 106A with other hosts.

In preferred embodiments of the invention, the circuits between the NIUs 106A, 106B and the hosts 104, 108 are digital circuits, so that there is no conversion of the voice and/or tones to an analog form anywhere between the source and destination hosts 104, 108.

Voice and application data are stored in voice and application storage spaces 110A, 112A, 110B and 112B. Source host 104, through the administrator 102, selects voice and application data to be transferred by sending control signals via control lines 120 and 122. Selected data is then read from storage and sent via bus 128 to the T1 lines 101. The data passes through the T1s and travels to the destination host 108. The application data includes static data including application level data, partition and location data, and class of service data. Each transfer is defined, by Administrator 102, as a session by allocating a session number and setting session specific parameters. The static data transfer is preferably performed once for all sessions before the first session in a group of defined sessions is run. The application data 112A also includes dynamic data comprising mailbox greetings and message data. The dynamic data is transferred for each defined session as per session data.

An example Sessions Definition Screen 200 is depicted in FIG. 2. This screen includes the parameters that the Administrator 102 defines to start a transfer session to transfer part of the voice messaging load to another host. The parameters to be set by the Administrator 102 include: a Session Number 202, a Recording Time Limit 204, a Maximum Transfer Dialogs number 206, Transfer Mailboxes 208 or Auto Attendants 209, a Partition 210, a Location 211, Mailbox Numbers 212, and Auto Attendant ID's 214. The Session Number 202 is referred to in all logging and reporting activities and identifies a transfer session. The Recording Time Limit 204 specifies the maximum length (in seconds) for any voice recording occurring in the Session. The Administrator 102 sets the parameter representing the number of Maximum Transfer Dialogs 206, or transmission lines 101, to be used in the transfer. This specified number of transfer dialogs will be initiated for the session and cannot exceed the number of physical ports available for outdialing. An important advantage over past procedures is that the amount of time needed to transfer the voice messaging load can be controlled by specifying the number of concurrent transfer dialogs that must be used in the transfer. The number of transfer dialogs is dynamically scaleable during the transfer process.

After the Administrator 102 specifies the number of transfer dialogs, it sets the parameter field 208 which specifies the transfer of Mailboxes. This field 208 is set to "Y" (for Yes) by default. By default, all of the mailboxes in the specified location will be transferred. An "NXX" is the first three digits in a seven digit local phone number, where "N" can be any number 2 through 9, and "X" can be any number. If only mailboxes with selected NXXs are to be transferred, rather than all mailboxes in a location, then the selected NXXs must be identified in the NXX fields on the screen 212. If the session should not transfer any mailboxes, field 208 should be set to "N" (for No).

The Administrator 102 may also set the parameter field 209 which specifies the transfer of Auto Attendants. An Auto or Automated Attendant is a device connected to a private branch exchange (PBX) and to voice mail systems. The Auto Attendant answers phones and allows the caller to choose options using a touch-tone phone and allows the caller to leave voice messages. This field 209 is set to "Y" by default. By default, all of the Auto Attendants in a specified Location, identified by field 211, will be transferred. If only selected Auto Attendant IDs 209 are to be transferred, then the selected Auto Attendant IDs must be identified in the field 214. If the session should not transfer any Auto Attendants, field 209 should be set to "N".

The Partition parameter field 210 specifies the partition from which the Mailboxes 212 and/or Auto Attendants 214 for the Session 202 must be transferred. The field 210 must be filled in with a valid partition identifier if any mailboxes are to be transferred in the Session identified in field 202. The field 210 may be left blank if only Auto Attendants 209 are to be transferred. If Auto Attendant transfer is requested, as represented in field 209, and the Partition field 210 is left blank, then by default all Auto Attendants in the entire system will be transferred. If selected Auto Attendants are specified in field 214, then only the selected ones will be transferred.

The Location parameter 211 specifies the Location from which the mailboxes and/or Auto Attendants for the Session must be transferred. By default, all mailboxes and/or Auto Attendants in the Location identified in field 211 will be transferred. To transfer mailboxes, the Location field 211 must be filled in. If only Auto Attendants are to be transferred in the Session, field 211 may be left blank. If Auto Attendant transfer is requested in field 209 and the Location field 211 is left blank, then by default all Auto Attendants in the Partition identified in field 210 will be transferred. If selected Auto Attendants are specified in field 214, then only the selected ones will be transferred.

An assumption employed in presently preferred embodiments of the invention is that, before a transfer, the Administrator 102 will lock the location(s) identified in field 211 in order to block voice mail access to the mailboxes that are to be transferred. Although it is not necessary that the call answer access be blocked, in preferred embodiments the call answer access is blocked on the source host 104 for the mailbox(es) (identified in field 212) to be transferred. The call answer message blocking is provided by the transfer process, where, once a mailbox 116A (FIG. 1) is extracted for transfer, it will no longer accept any call answer messages. In a preferred embodiment of the invention, both the voice mail and the call answer access blocking are in place for the entire duration of the transfer process.

The Sessions Control Screen 300 depicted in FIG. 3 permits the Administrator 102 (FIG. 1) to monitor and control a transfer process by displaying the status of a transfer. The fields displayed include: a Session Number field 302, a number of Maximum Dialogs field 304, a number of Current Dialogs used field 306, a number of a Partition and a Location field 308, a Recording Time Limit field 310, an Action field 312, Session Statistics field 314, and Session Start and End times field 316. The Sessions Control Screen 300 displays information about a Session identified in field 302, one of one or more Sessions that the Administrator 102 (FIG. 1) defined in the Sessions Definition Screen 200 (FIG. 2).

The Session Number field 302 specifies the transfer session being monitored and a Session Number for which an Action identified in field 312 is being taken. The Maximum Dialogs specified in field 304 correspond to the Maximum Transfer Dialogs of field 206 on the Sessions Definition Screen 200 (FIG. 2). The Current Dialogs field 306 displays the number of transfer dialogs currently utilized in the transfer for the Session Number specified in field 302. The Partition and Location field 308 displays the information defined for the Session Number 302 in progress, and corresponds to fields 210 and 211 of screen 200 (FIG. 2). The Recording Limit field 310 displays the maximum time limit, in seconds, for any recording occurring in the Session specified in field 302 and corresponds to field 204 of screen 200.

The Action field 312 specifies the Action to be taken for a Session specified in field 302. When the Administrator 102 (FIG. 1) chooses Extract for an Action, as indicated in field 312, then all of the data related to the Mailboxes identified in field 212 (FIG. 2) to be transferred by the static data transfer procedures and all of the Auto Attendant related data to be transferred are marked to be extracted for the Session specified in field 302. Each related mailbox is marked as "Selected for Transfer" in the defined transfer session identified in fields 202, 302.

When the Administrator 102 (FIG. 1) chooses Start for an Action (field 312), then the Session transfer is started immediately. Restart may be chosen by the Administrator 102 from the Action field 312, and the transfer for the Session identified in field 302 is restarted for the mailbox components that are pending transfer or that were unsuccessfully transferred. The Session transfer, if in progress, will be terminated immediately when the Administrator 102 enters Terminate in the Action field 312.

The Administrator 102 chooses Calculate-Statistics in the Action field 312 to calculate the current transfer statistics of fields 314 and 316 for the Session Number specified in field 302. The date and time at which the last Statistics Count was requested is displayed in field 314. A count of the Mailboxes and Auto Attendants (identified in fields 212 and 214 (FIG. 2)) that were transferred successfully at the last Statistics Count is displayed in field 314. A Mailbox or Auto Attendant is successfully transferred when all its transfer components have been transferred successfully. A count of the Mailboxes and Auto Attendants that were transferred partially or that were pending transfer at the last Statistics Count is also displayed in field 314. The Statistics in field 316 report the date and time the Session of field 302 was last started and the date and time that Session ended.

Figure 4:
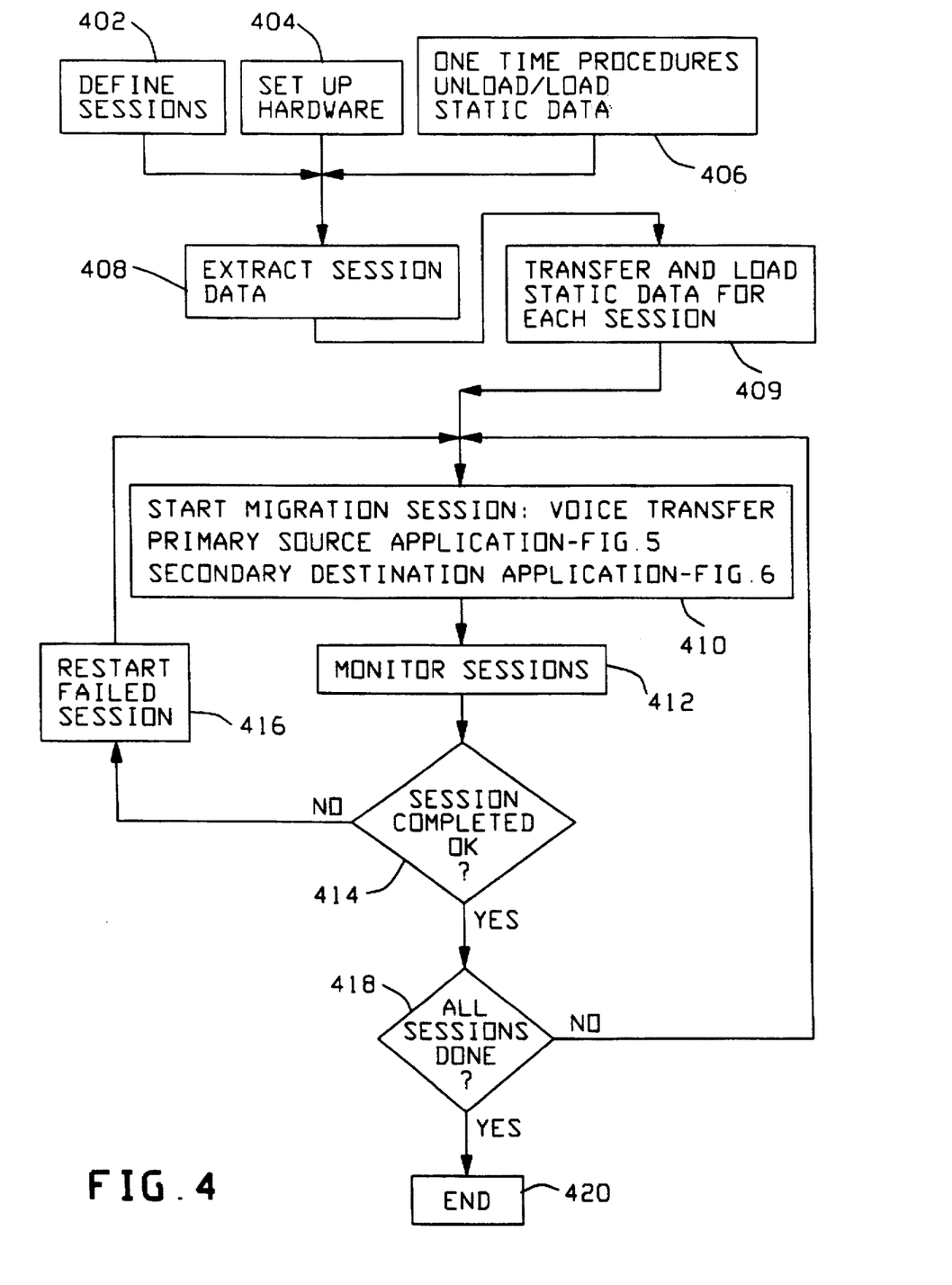
FIG. 4 is a flowchart illustrating an overview of a voice messaging load transfer process in accordance with the present invention.

FIG. 4 depicts an overview of the process for transferring entire voice messaging mailboxes (116A, 116B) from a source host 104 to a destination host 108 (FIG. 1), while minimizing the time the system is unavailable to users. At step 402, the Administrator 102 selects which mailboxes are to be moved over to a different host by defining a Session on the host. In defining the sessions 200 (FIG. 2), keys are established to relate the voice data 110A, 110B to the per session data 202 and to relate the voice data 110A, 110B to the proper mailbox 116A when it is received by the destination host 108. Each message has its own identifier key, or tag, that is created when the destination host 108 is assigned as per session data (see field 202 of FIG. 2). The mailbox holder's name and greeting is identified by the individual mailbox number (see field 212 of FIG. 2). At step 402, the session is defined when the Administrator 102 specifies which mailboxes to transfer and a number of transfer dialogs to be used to complete the transfer.

An estimation of the transfer time in the preferred embodiment for a mailbox with no messages is 38 seconds per mailbox. With an average of 3 messages per mailbox, the transfer time is 152 seconds, or approximately 23 mailboxes per hour. Assuming a transfer over a dedicated T1 transmission link, which contains 24 voice channels, the transfer rate is approximately 552 mailboxes per T1-hour, using the stated average 3 messages per mailbox. The overhead time included in the above calculations account for the processor times and database update times. The above transfer times do not include overhead time for dialog initiation, handshakes, digit collection and recording time-outs or digit retransmittals in case of errors.

The Hardware to be used in the transfer is set up in step 404. This step also initializes the transmission lines. Once the Administrator 102 defines a transfer session in step 402, by setting all of the parameters on the sessions Definition Screen 200, the transfer of mailboxes 116A in the voice messaging load can begin.

In step 406, the static data is transferred once for all sessions before the first session is run. In a referred embodiment of this invention, a file transfer mechanism used to transfer all static data from one host to another.

In step 408, the Sessions Data is extracted, after the static data has been transferred in step 406 to the destination host 108. Each related mailbox 116A to be extracted is marked as "Selected for Transfer" in the transfer Session defined in step 402.

In step 409, static data for each session is transferred to and loaded in the destination host.

In step 410, the transfer of voice 110A and mailbox related or application data 112A begins. The source host 104 sends packets of mailbox related data 112A and voice message information 110A to the destination host 108. The transfer of all mailbox information for the session is monitored in step 412 and, when the transfer is completed, the results are verified in step 414. The Session Statistics are shown in fields 314 and 316 of the Sessions Control Screen 300 (FIG. 3). If a Session was terminated or was unsuccessful, then the failed Session is Restarted in step 416. The transfer continues until all Sessions defined in step 402 and indicated in field 202 (FIG. 2) are transferred, as verified in step 418.

Figure 5:
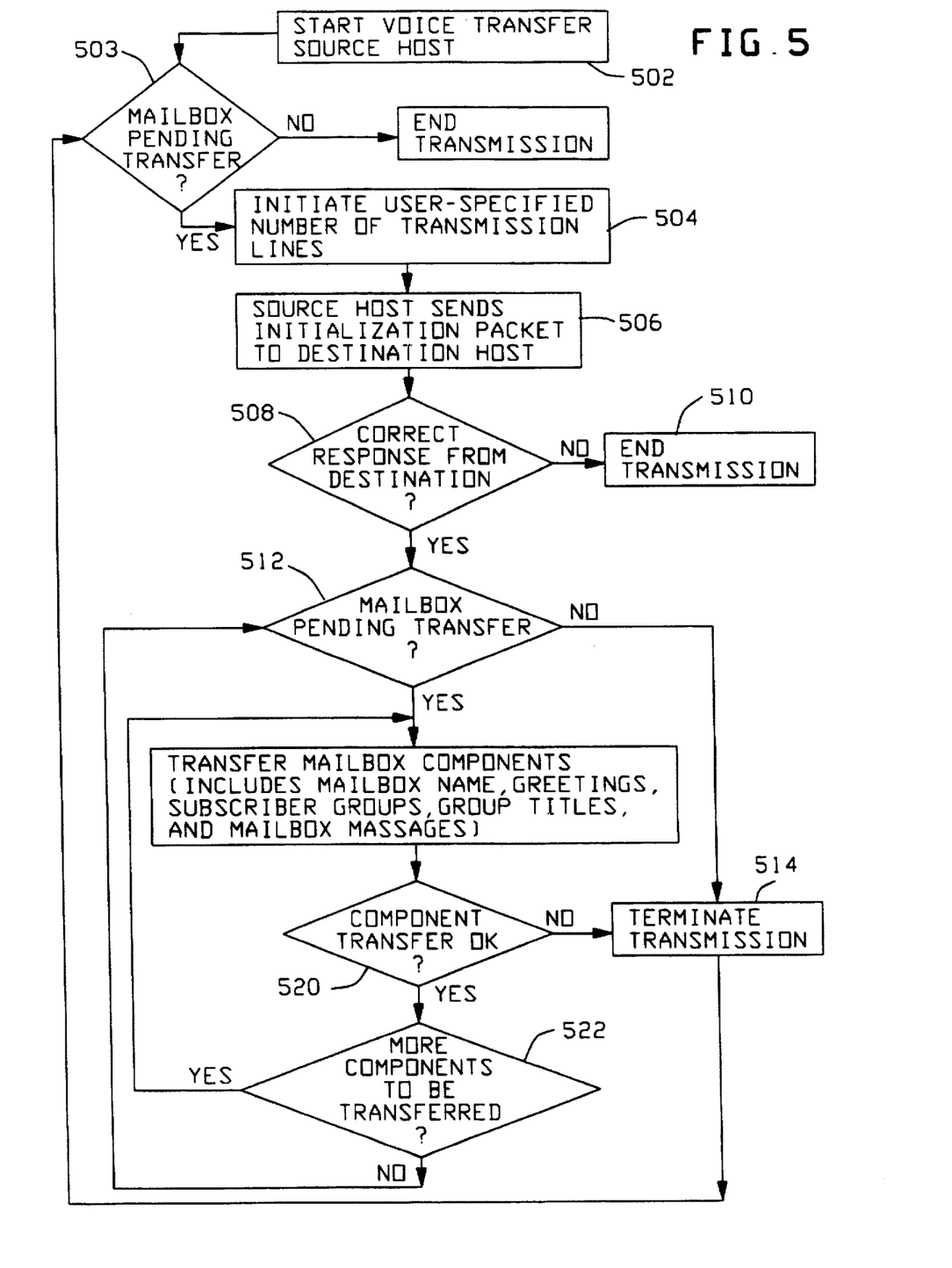
FIG. 5 is a flowchart illustrating the voice messaging transfer process at a source host.

In FIG. 5, the steps employed to transfer mailbox components, including voice 110A and application data 112A, from the source host 104 to the destination host 108 are shown. In step 502, the voice transfer is started in the source host. In step 503, the system determines whether any mailboxes are pending transfer. If not, the transmission is ended. If so, the system proceeds to step 504.

In step 504, the number of dialogs or transmission lines 101 that are defined for the Session are initialized. Next, the source host 104 initiates a call to the destination host 108 and the two applications conduct a handshake routine in steps 506 and 508 (and steps 604, 606, and 608 of FIG. 6), where they exchange certain dialog-related parameters. This exchange permits the synchronization between the source host 104 and destination host 108. In this handshake routine, the source host 104 sends an initialization packet to the destination host 108. This packet contains the Session number of field 202 (FIG. 2) for the dialogs that have been initiated. If the correct response is not received from the destination host 108, or a response in not received in a fixed time, then the call is terminated 510, e.g., after three tries. If the correct response 508 is received from the destination host 108, then the handshake is completed and the source host 104 can transmit data.

Once the destination host 108 is initialized, the transfer of mailboxes begins in steps 512 and 518. All mailbox components are transmitted in the transfer using DTMF tones or voice or a combination, played back with the NAP Enhanced Send Voice Command. Any string of DTMF digits being transmitted will be called a packet. The components include the mailbox name, greetings, extended greetings, subscriber groups, group titles, and voice messages. The source host 104 (FIG. 1) receives a response from the destination host 108 after each packet is sent, which allows the source host 104 to determine if the components were transferred successfully. This determination is made in step 520. If the source host 104 does not receive the expected response, it will attempt to transmit the same message again. If the expected response is not received after three tries, the source host 104 will terminate that particular dialog without affecting other dialogs that may be current. The transmission is terminated in step 514. After the transfer is terminated, the system loops back to check if any more mailboxes are pending transfer in step 503.

If the transfer of one packet occurs without an error as determined at step 520, then the source host 104 checks to determine whether there are more mailbox components to be transferred. This determination is made in step 522. The transfer of components continues until all components of a mailbox are transferred. When the transfer is completed for all components of one mailbox, the system determines, in step 512, if more mailboxes are pending transfer. If there are more mailboxes, then the components for the next mailbox are transferred 518. When there are no more mailboxes pending transfer 512, the transmission is terminated and the session monitor reports on the progress of the transfer and the extent of completion.

Figure 6:
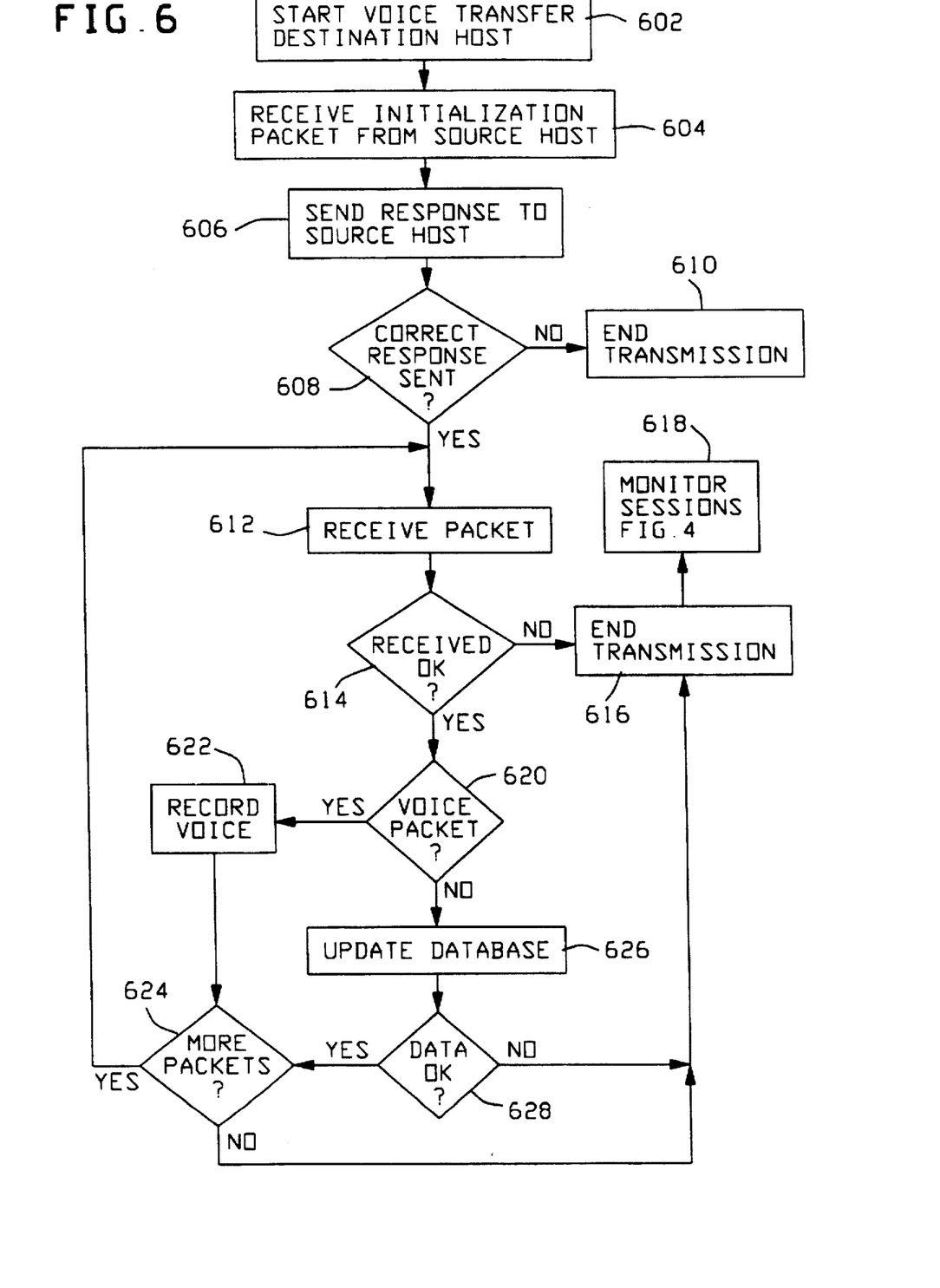
FIG. 6 is a flowchart illustrating the voice messaging transfer process at a destination host.

While the source host 104 sends information, the destination host receives information as shown in the process outlined in FIG. 6. A handshake routine is conducted between the source host 104 and the destination host 108. Steps 604, 606, 608, 506 and 508 perform this handshake routine. In this handshake routine, in step 604, the destination host 108 receives an initialization packet from the source host. The destination host 108 responds in step 606 with a checksum. If the destination host 108 receives the same initialization packet again, it indicates in step 608 that the host 104 did not receive the checksum response successfully or that the checksum was incorrect. After trying to respond correctly three times, the transmission is terminated in step 610 because the handshake failed, indicating something is wrong in the connection. Otherwise, if the handshake is completed correctly, the transmission begins in step 612 with the destination host 108 receiving packets of mailbox data and voice data from the source host 104.

The transmission is ended in step 616 if the destination host 108 does not receive a packet correctly, as determined in step 614. In step 618, the sessions monitor (see screen 300 of FIG. 3) reports the transmission error.

When the packet is received correctly by the destination host 108, in step 614, then the destination host 108 checks the type of packet that it has received and sends the appropriate response to the source host 104 to signal that the packet was received properly. See steps 520 (FIG. 5) and 614 (FIG. 6).

If the destination host 108 determines that the received packet contains mailbox data, the database is updated in step 626, and the data is verified for accuracy in step 628. If the data is correct, then the destination host 108 waits to receive more packets in steps 624 and 612. When the data is not correct as determined in step 628 or when there are no more packets to be received as determined in step 624, then the transmission is terminated in step 616 and the sessions monitor reports the status of the session.

In a preferred embodiment of the invention, the destination host 108 expects to receive only digits from a source host 104. When the source host 104 is ready to send a voice message packet 518, it sends a command to the destination host 108 to inform it that the next packet will be a voice message. The destination host 109 informs the source host 104 that it is ready to receive the voice message 620 and the destination host 108 proceeds to receive and record the voice 622. The voice will be recorded using the NAP Enhanced Send Voice Message Command and the voice will be recorded until the "#" tone marking the end of the voice is received.

In a preferred embodiment of the invention, to avoid the possibility that the destination host 108 starts recording before the voice is actually sent, the voice type commands are standardized to begin with the "C" tone, and all recordings are terminated if a "C" tone is received.

If there is an error in receiving the packet, the transmission is terminated in step 616 and the sessions monitor reports the error in step 618. The system continues to receive more packets until all packets have been transmitted. When all the packets are received from one mailbox, then the destination host 108 starts the process over and starts to receive packets containing components of the next mailbox. When there are no more packets to be sent by the source host 104, and there are no more mailboxes to be transferred, the transmission is terminated and the sessions monitor reports on the status of the transfer.

While various embodiments and features of the present invention are disclosed above, it should be understood that they have been presented by way of example only, and not limitation. Many modifications and variations of the present invention are possible in light of the above teachings. Thus, the breadth and scope of protection of the following claims should not be limited to the above-described exemplary embodiments.

What is claimed is:

1. A system for transferring voice and data in a telephony application from a source host to a destination host, comprising:

means for permitting a user to specify a number of mailboxes to be transferred;

means for permitting a user to specify a number of transfer dialogs to be used for said transfer of voice and data;

means for identifying static and dynamic data to be transferred;

means for transferring static data first and thereafter transferring dynamic data, wherein numerical mailbox data and numerical message data are transferred by encoding said numerical mailbox and numerical message data in digitized Dual Tone Multiple Frequency (DTMF) tones, and wherein voice messages are transferred as digital voice data; and means for permitting a user to monitor characteristics of said transfer as said transfer is occurring.

2. A system as claimed in claim 1, wherein the voice and data transfer is effected by employing one or more transfer dialogs between said source and destination hosts, and further comprising means for dynamically adjusting an amount of time required to complete said transfer by increasing or decreasing the number of transfer dialogs employed in the transfer.

3. A system as claimed in claim 1, further comprising means for maintaining relationships among all components of mailboxes to be transferred.

4. A system as recited in claim 3, wherein said means for maintaining relationships among all components of mailboxes to be transferred includes means for maintaining a key associated with each voice message to relate each voice message to corresponding non-voice data, wherein the non-voice data is identified by a mailbox number.

5. A system as claimed in claim 4, wherein said components of said mailboxes to be transferred include each mailbox holder's recorded name, greetings, extended absence greetings, subscriber groups, group titles, and mailbox voice messages.

6. A system as claimed in claim 1, further comprising simulation means for simulating the voice and data transfer before an actual transfer is carried out, wherein the amount of time to complete said transfer is estimated by said voice and data simulation means.

7. A system as claimed in claim 1, further comprising means for detecting data corrupted during the transfer and resending the corrupted data.

8. A system as claimed in claim 1, further comprising means for permitting a user to specify a number of mailboxes to be transferred and an amount of time to complete the voice and data transfer.

9. A system as claimed in claim 1, wherein the voice and data transfer is effected by employing one or more transfer dialogs between said source and destination hosts, and further comprising means for dynamically adjusting an amount of time required to complete said voice and data transfer by increasing or decreasing the number of transfer dialogs employed in the transfer; further comprising means for maintaining relationships among all components of mailboxes to be transferred; further comprising simulation means for simulating said voice and data transfer before an actual transfer is carried out, wherein the amount of time to complete said voice and data transfer is estimated by said simulation means; further comprising means for detecting data corrupted during the transfer and resending the corrupted data; and further comprising means for permitting a user to specify a number of mailboxes to be transferred and an amount of time to complete the transfer of said mailboxes.

10. A system as recited in claim 9, wherein said means for maintaining relationships among all components of the mailboxes to be transferred includes means for maintaining a key associated with each voice message to relate each voice message to corresponding numerical data, wherein the numerical data is identified by a mailbox number; and wherein said components of said mailboxes to be transferred include each mailbox holder's recorded name, greetings, extended absence greetings, subscriber groups, group titles, and mailbox voice messages.

11. A system as claimed in claim 6, wherein said simulation means includes means for analyzing the order in which the mailboxes will be transferred and estimates of the time taken to transfer each mailbox.

12. A system as claimed in claim 1, wherein the system permits the selection of groups of mailboxes, auto attendants, and/or any atomic voice or data component to be transferred.

13. A method for transferring voice and data in a telephony application from a source host to a destination host, comprising the steps of:

specifying a number of mailboxes to be transferred;

specifying a number of transfer dialogs to be used for said transfer of voice and data;

identifying static and dynamic data to be transferred; and transferring static data first and thereafter transferring dynamic data, wherein numerical mailbox data and numerical message data are transferred by encoding said numerical mailbox and numerical message data in digital Dual Tone Multiple Frequency (DTMF) tones, and wherein voice messages are transferred as digital voice data; and permitting a user to monitor characteristics of said transfer as said transfer is occurring.

14. A method as claimed in claim 13, wherein the voice and data transfer is effected by employing one or more transfer dialogs between said source and destination hosts, and further comprising dynamically adjusting an amount of time required to complete said transfer by increasing or decreasing the number of transfer dialogs employed in the transfer.

15. A method as claimed in claim 13, further comprising maintaining relationships among all components of mailboxes to be transferred.

16. A method as recited in claim 15, wherein said step of maintaining relationships among all components of the mailboxes to be transferred includes maintaining a key associated with each voice message to relate the voice message to corresponding non-voice data, wherein the non-voice data is identified by a mailbox number.

17. A method as claimed in claim 16, wherein said components of said mailboxes to be transferred include each mailbox holder's recorded name, greetings, extended absence greetings, subscriber groups, group titles, and mailbox voice messages.

18. A method as claimed in claim 13, further comprising simulation simulating the voice and data transfer before an actual transfer is carried out, wherein the amount of time to complete said voice and data transfer is estimated in said simulation step.

19. A method as claimed in claim 13, further comprising detecting data corrupted during the transfer and resending the corrupted data.

20. A method as claimed in claim 13, further comprising permitting a user to specify a number of mailboxes to be transferred and an amount of time to complete the voice and data transfer.

21. A method as claimed in claim 13, wherein said voice and data transfer is effected by employing one or more transfer dialogs between said source and destination hosts, and further comprising dynamically adjusting an amount of time required to complete said voice and data transfer by increasing or decreasing the number of transfer dialogs employed in the voice and data transfer; further comprising maintaining relationships among all components of mailboxes to be transferred; further comprising simulation simulating said voice and data transfer before an actual transfer is carried out, wherein the amount of time to complete said voice and data transfer is estimated in said simulation step; further comprising detecting data corrupted during the voice and data transfer and resending the corrupted data; and further comprising permitting a user to specify a number of mailboxes to be transferred and an amount of time to complete the transfer of said mailboxes.

22. A method as recited in claim 21, wherein said step of maintaining relationships among all components of the mailboxes to be transferred includes maintaining a key associated with each voice message to relate each voice message to corresponding numerical data, wherein the numerical data is identified by a mailbox number; and wherein said components of said mailboxes to be transferred include each mailbox holder's recorded name, greetings, extended absence greetings, subscriber groups, group titles, and mailbox voice messages.

23. A method for distributing a call processing load, comprising the steps of:

a) defining a distribution session;

b) connecting hosts to be used in transfer of data;

c) verifying configuration of outgoing lines of a source system;

d) verifying configuration of incoming lines of a destination system;

e) transferring static data before a first distribution session is run;

f) transferring mailbox-related data;

g) transferring voice data one mailbox at a time;

h) receiving said static data;

i) receiving said mailbox-related data;

j) receiving said voice data;

k) verifying non-voice data for accuracy;

l) rejecting any corrupted data; and m) resending said corrupted data, if any.

24. A method for performing incremental transfer of voice and data in a telephony application from a source host to a destination host, comprising the steps of:

specifying a number of mailboxes to be transferred;

specifying a number of transfer dialogue to be used for said transfer of voice and data;

identifying static and dynamic data to be transferred; and transferring static data first and thereafter transferring dynamic data;

wherein numerical mailbox data and numerical message data are transferred by encoding said numerical data in digital Dual Tone Multiple Frequency (DTMF) tones, voice messages are transferred as digital voice data, and the transfer of the identified static and dynamic data is performed while maintaining availability of the telephony application to most of its users.

25. A method as recited in claim 24, further comprising permitting a user to monitor characteristics of the transfer.

* * * * *